US012769271B2

(12) United States Patent
Mohd Zulkefli et al.

(10) Patent No.: US 12,769,271 B2
(45) Date of Patent: Oct. 20, 2026

(54) GRID CONTROL

(71) Applicant: Eaton Intelligent Power Limited, Dublin (IE)

(72) Inventors: Mohd Azrin Mohd Zulkefli, Eden Prairie, MN (US); Arun Sukumaran Nair, Denver, CO (US); Yi Yang, Arvada, CO (US); Souvik Chandra, Lakewood, CA (US); Roger Alexander, Rockville, MD (US)

(73) Assignee: Eaton Intelligent Power Limited, Dublin (IE)

( * ) Notice: Subject to any disclaimer, the term of this patent is extended or adjusted under 35 U.S.C. 154(b) by 583 days.

(21) Appl. No.: 18/193,957

(22) Filed: Mar. 31, 2023

(65) Prior Publication Data

US 2023/0315037 A1 Oct. 5, 2023

Related U.S. Application Data

(60) Provisional application No. 63/326,010, filed on Mar. 31, 2022.

(51) Int. Cl.
*G05B 19/042* (2006.01)

(52) U.S. Cl.
CPC .... *G05B 19/042* (2013.01); *G05B 2219/2639* (2013.01)

(58) Field of Classification Search
CPC .......... G05B 19/042; G05B 2219/2639; G06Q 10/063; G06Q 30/0201; G06Q 50/06; H02J 2203/10; H02J 2310/64; H02J 3/381; H02J 3/14; H02J 13/00006
See application file for complete search history.

(56) References Cited

U.S. PATENT DOCUMENTS 10,298,016 B1 * 5/2019 Johnson ............ H02J 13/00017
2019/0020220 A1 * 1/2019 Lian ........................ H02J 13/00
(Continued)

FOREIGN PATENT DOCUMENTS

CN 113988560 A 1/2022

OTHER PUBLICATIONS

Extended European Search Report for Application No. 23165379.1 mailed Sep. 8, 2023.
(Continued)

*Primary Examiner* — Yuhui R Pan
(74) *Attorney, Agent, or Firm* — Merchant & Gould P.C.

(57) ABSTRACT

Power grid management systems and methods include determining a power reference, and sending a first message from a first controller to each of a plurality of second controllers based on the power reference. Each of the plurality of second controllers is configured to control a plurality of associated distributed energy resources (DERs). Energy usage of the associated DERs is modified by each of the plurality of second controllers based on the first message. Each of the second controllers sends feedback data to the first controller message based on the modified energy usage of the associated DERs. The feedback data is aggregated by the first controller, and the aggregated feedback data is compared to the power reference. The first controller sends a second message to each of the plurality of second controllers based on the comparison.

18 Claims, 6 Drawing Sheets

(56) References Cited

U.S. PATENT DOCUMENTS

| | | | | |
|---|---|---|---|---|
| 2020/0175617 | A1 | 6/2020 | Martinez | |
| 2020/0259329 | A1* | 8/2020 | Brissette | G06Q 30/0283 |

OTHER PUBLICATIONS

Mai et al., "An overview of grid-edge control with the digital transformation," Electrical Engineering, vol. 103, https://doi.org/10.1007/s00202-020-01209-x, pp. 1989-2007 (2021).

Z. Csetvei et al., "Controlling price-responsive heat pumps for overload elimination in distribution systems," 2nd IEEE PES International Conference and Exhibition on Innovative Smart Grid Technologies, pp. 1-8, Dec. 2011.

P. Nyeng and J. Ostergaard, "Information and Communications Systems for Control-by-Price of Distributed Energy Resources and Flexible Demand," IEEE Transactions on Smart Grid, vol. 2, No. 2, pp. 334-341, Jun. 2011.

D. J. Hammerstrom et al., "Pacific Northwest GridWiseTM Testbed Demonstration Projects, Part I." Olympic Peninsula Project, National Technical Information Service, U.S. Department of Commerce, Oct. 2007.

* cited by examiner

GRID CONTROL

CROSS-REFERENCE

This application claims the benefit of U.S. Provisional Patent Application No. 63/326,010, filed on Mar. 31, 2022, which is incorporated by reference in its entirety.

GOVERNMENT LICENSE RIGHTS

This invention was made with government support under Contract No. DE-EE0009023 awarded by the National Energy Technology Laboratory funded by the Office of Energy Efficiency & Renewable Energy of the United States Department of Energy. The government has certain rights in the invention.

BACKGROUND

Electricity is typically distributed from producers to consumers via an electrical power grid. During certain events, customers are requested or incentivized either electronically or manually control their energy usage. For example, demand response is a grid management technique that may be employed during a grid service event where retail or wholesale customers are requested or incentivized either electronically or manually to reduce their energy load. For instance, customers may be encouraged to use power when electricity is plentiful by allowing for variable pricing.

Managing consumers' energy-consuming appliances such as air-conditioners, heat exchangers, electric water heaters, electric vehicle charging systems, solar plus battery storage, and the like, also referred to as decentralized distributed energy resources (DERs), typically necessitates a local behind-the-meter controller to manage local DERs. In some known systems, the controller typically allocates turning on and off schedules for local DERs to avoid exceeding a maximum power threshold during the DR event, while maintaining DERs Quality-of-Services and minimizing energy cost.

SUMMARY

In accordance with some aspects of the present disclosure, a power grid management method includes determining a power reference and sending a first message from a first controller to each of a plurality of second controllers based on the power reference. Each of the plurality of second controllers is configured to control a plurality of associated distributed energy resources (DERs). Energy usage of the associated DERs is modified by each of the plurality of second controllers based on the first message. Each of the second controllers sends feedback data to the first controller message based on the modified energy usage of the associated DERs. The feedback data is aggregated by the first controller, and the aggregated feedback data is compared to the power reference. The first controller sends a second message to each of the plurality of second controllers based on the comparison.

In accordance with further aspects of the disclosure, a power grid management system includes a first, or central controller configured to determine a power reference and send a first message to each of a plurality of second, or edge controllers based on the power reference. Each of the plurality of second controllers is configured to control a plurality of associated distributed energy resources (DERs). The first controller receives feedback data from each of the plurality of second controllers based on modified energy usage of the associated DERs based on the first message. The first controller aggregates the received feedback data, and compares the aggregated feedback data to the power reference. The first controller then sends a second message to each of the plurality of second controllers based on the comparison of the aggregated feedback data to the power reference.

In accordance with still further aspects of the disclosure, a power grid management system includes a plurality of edge controllers, each of which is associated with a respective dwelling receiving power from a utility. Each of the plurality of edge controllers is configured to receive a uniform power adjustment message from a central controller. Each of the plurality of edge controllers is further configured to modify energy usage of a plurality of associated distributed energy resources (DERs) based on the uniform power adjustment message. Still further, each of the plurality of edge controllers is configured to send feedback data to the central controller based on the modified energy usage of the plurality of DERs.

DETAILED DESCRIPTION

Figure 1:
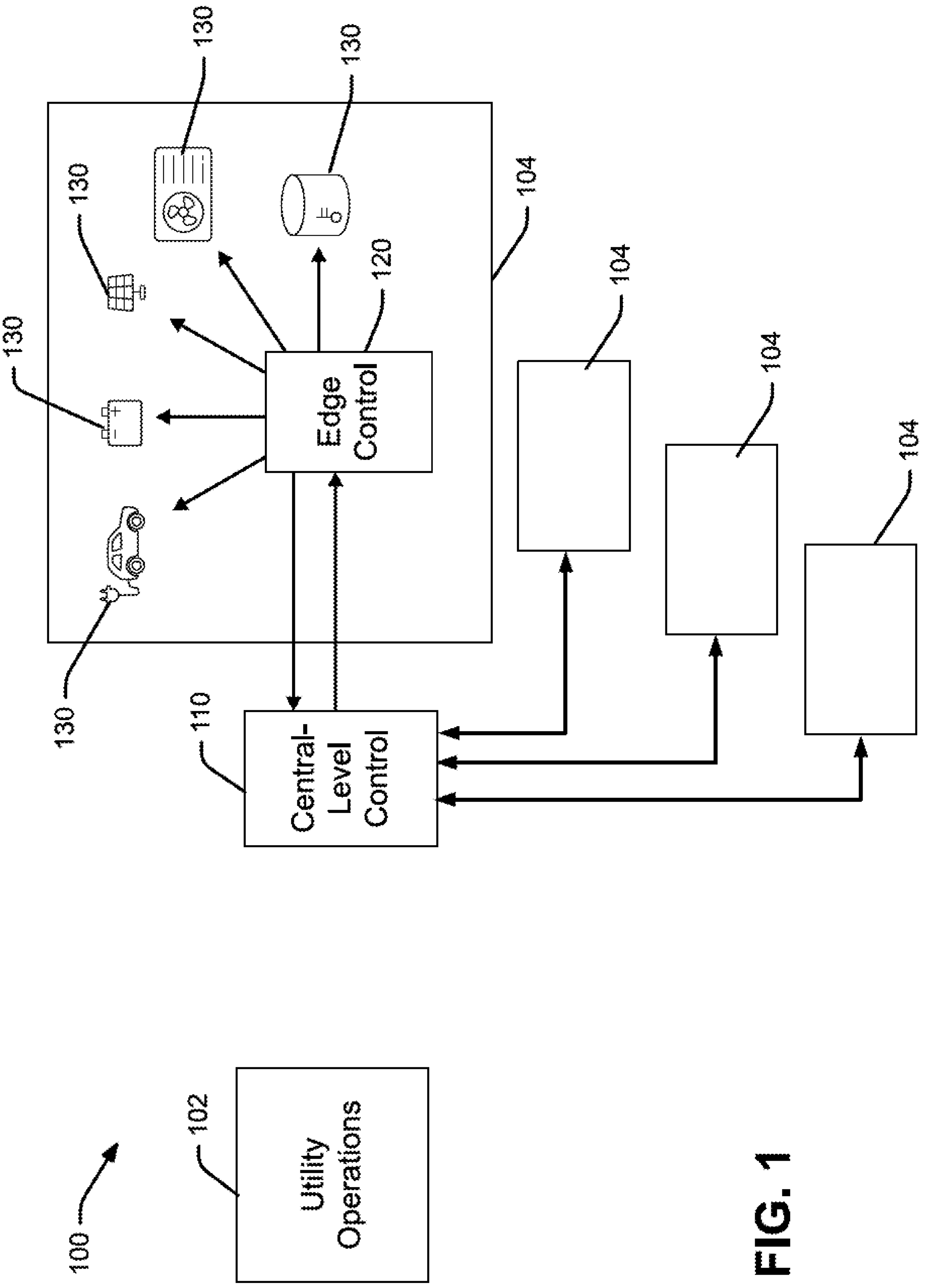
FIG. 1 is a block diagram illustrating an example of a power grid management system in accordance with aspects of the present disclosure.

In the following Detailed Description, reference is made to the accompanying drawings, which form a part hereof, and in which is shown by way of illustration specific embodiments in which the invention may be practiced. In this regard, directional terminology, such as top, bottom, front, back, etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense.

Electricity is typically distributed from producers to consumers via an electrical power grid. With the increasing introduction of distributed energy resources in the distribution network, power flows are becoming increasingly dynamic and multidirectional. This provides greater challenges for the uniform and reliable provision of power to consumers. Grid service management and Demand Response (DR) in particular, is a means of affecting a change in the power consumption of an electric utility customer to better match the demand for power with the supply. Utilities may signal demand requests to their customers in a variety of ways, including simple off-peak metering, in which power is cheaper at certain times of the day, and smart metering, in which explicit requests or changes in price can be communicated to customers. The customer may adjust power demand by postponing some tasks that require large amounts of electric power, or may decide to pay a higher price for their electricity. Some customers may switch part of their consumption to alternate sources, such as on-site solar panels and batteries.

Managing consumers' energy-consuming appliances, also referred to as decentralized distributed energy resources (DERs), typically necessitates a local behind-the-meter controller to manage local DERs. The controller typically allocates turning on and off schedules for local DERs to avoid exceeding a maximum power threshold during a grid service or DR event, while maintaining DERs Quality-of-Services and minimizing energy cost.

In accordance with aspects of this disclosure, a consumer-side controller, or "edge controller" is configured to control multiple DERs in a household to provide load flexibility for utility grid services. For example, the edge controller may turn on and off certain DERs, such as the home air-conditioner or electric water heater, to avoid exceeding the net home power threshold during a grid service event. In contrast, a traditional DR program may attempt to centrally control DERs such as air-conditioner units for multiple households, without considering feedback from individual households.

The edge controller may be part of a smart power meter, which may be configured to record household power consumption information such as consumption of electric energy, voltage levels, current, frequency, power factor, and the like. The smart meter may communicate such information to the consumer (e.g., homeowner and/or residents) for greater clarity of consumption behavior, and also to electricity suppliers (e.g., utility company) for system monitoring and customer billing. The smart meter may record energy in or near real-time, and report regularly throughout the day.

In addition, the smart meter may enable two-way communication between the smart meter/edge controller and a central controller, such as a power utility computer system. Communications between the smart meter/edge controller to the utility central controller may be wireless or via fixed wired connections such as Power Line Carrier (PLC). In some instances, the edge controller may receive grid service event instructions from the utility central controller, which may include a DR event seeking to adjust the demand for power.

FIG. 1 illustrates aspects of a grid control system 100 in accordance with disclosed embodiments. The system 100 includes a first controller, such as the central level controller 110. The central controller 110 communicates with a utility operation 102 to receive, among other things, operational signals. For example, the central controller 110 may receive grid service event signals such as instructions for peak power shaving.

The central controller 110 communicates with a second controller, such as an edge controller 120, which may be a component of, or associated with, a smart electric meter. The edge controller 120 is located at a dwelling 104 such as a house, townhouse, condominium, apartment, or other structure that receives power from a utility (for simplicity, FIG. 1 illustrates aspects of only one of the dwellings 104). The central controller 110 and edge controller 120 may communicate via any suitable communications network, such as the internet, wired or wireless telephone networks, etc. as will be discussed further below.

The edge level controller 120 communicates with and controls a plurality of DERs 130 associated with the residence 104, such as an air conditioner, heat pump, electric vehicle charger, solar energy panels, battery storage unit, water heater, etc. Further, home level information regarding the DERs 130 is collected by the edge controller 120, which may be used to model, forecast and control the DERs 130 for grid services. The central controller 110 communicates with several of the edge controllers 120 associated with respective dwellings 104 to facilitate grid requirements from the edge level resources (i.e. DERs) during a grid service event.

Certain elements described above, such as the edge controller 120 and central controller 110, as well as processing components of the DERs 130, may be practiced in hardware and/or in software (including firmware, resident software, micro-code, etc.) or in any other circuits or systems. This may further include electrical circuits comprising discrete electronic elements, packaged or integrated electronic chips containing logic gates, a circuit utilizing a microprocessor, or on a single chip containing electronic elements or microprocessors. Other technologies capable of performing logical operations such as, for example, AND, OR, and NOT, including but not limited to, mechanical, optical, fluidic, and quantum technologies may be further employed.

Figure 2:
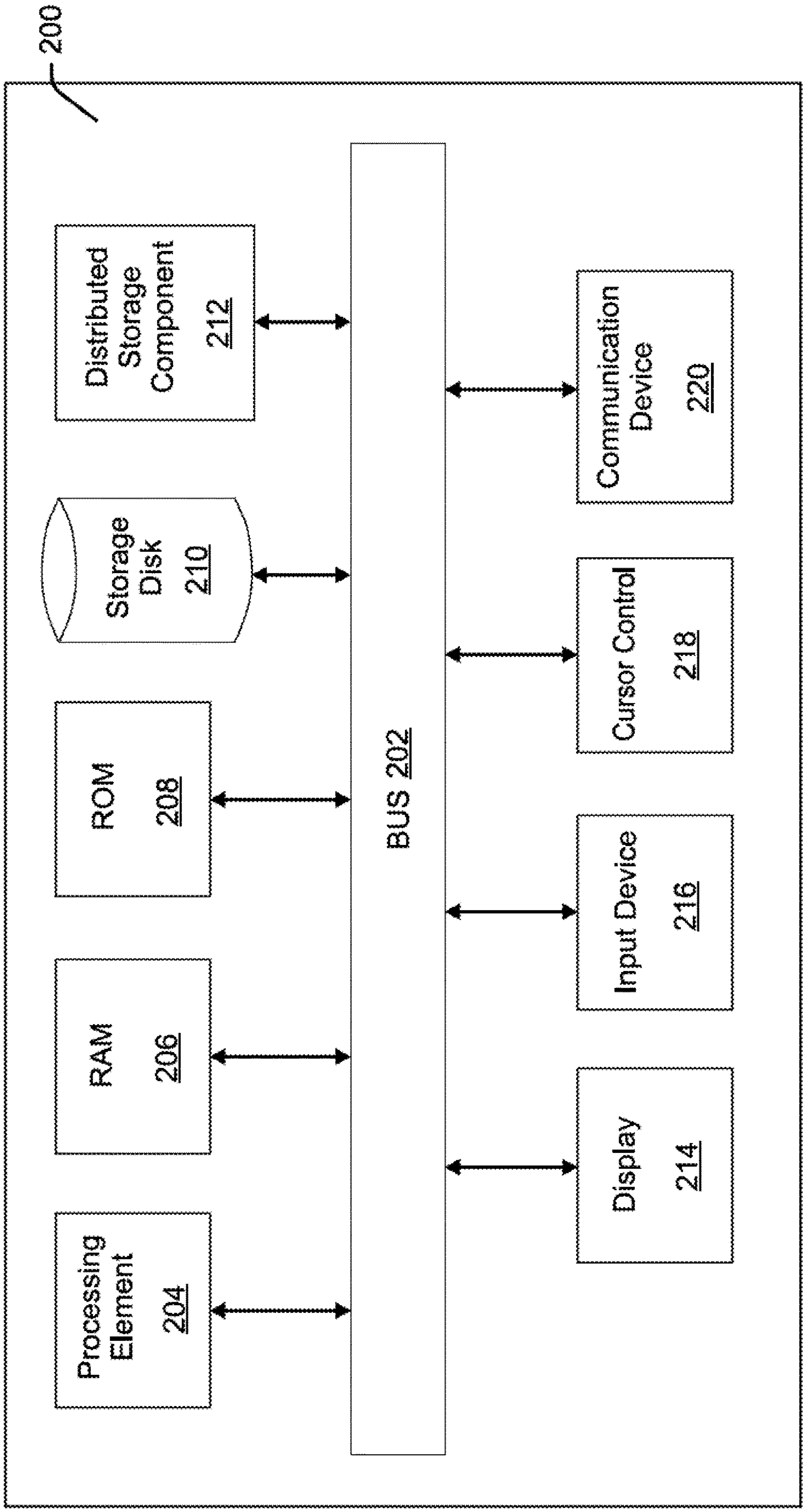
FIG. 2 is a block diagram of a computer system suitable for use by the power grid management system illustrated in FIG. 1.

FIG. 2 depicts a block diagram of a computing device 200 suitable for implementing the central control 110, the edge controller 120, DER controllers, and/or components thereof. In the illustrated example, the computing device 200 may include a bus 202 or other communication mechanism of similar function for communicating information, and at least one processing element 204 (collectively referred to as processor or processing element 204) coupled with bus 202 for processing information. As will be appreciated by those skilled in the art, the processing element 204 may include a plurality of processing elements or cores, which may be packaged as a single processor or in a distributed arrangement. Furthermore, a plurality of virtual processing elements 204 may be included in the computing device 200 to provide the control or management operations for the DERs 130 discussed above.

The computing device 200 may also include one or more volatile memory(ies) 206, which can for example include random access memory(ies) (RAM) or other dynamic memory component(s), coupled to one or more buses 202 for use by the at least one processing element 204. The computing device 200 may further include static, non-volatile memory(ies) 208, such as read only memory (ROM) or other static memory components, coupled to buses 202 for storing information and instructions for use by the at least one processing element 204. A storage component 210, such as a storage disk or storage memory, may be provided for storing information and instructions for use by the at least one processing element 204. As will be appreciated, the computing device 200 may include a distributed storage component 212, such as a networked disk or other storage resource available to the computing device 200.

The computing device 200 may be coupled to one or more displays 214 for displaying information to a user. The computing device 200 may further include an input/output (I/O) component, such as a serial connection, digital connection, network connection, or other input/output component for allowing intercommunication with other computing components and the DERs 130 and other devices as necessary.

In various embodiments, the computing device 200 can be connected to one or more other computer systems via a network to form a networked system. In this manner, for example, the central controller 110 and edge controller 120 may be configured to communicate with one another, as well as to provide connections between the edge controller and the DERs 130. Such networks can, for example, include one or more private networks or public networks, such as the Internet. In the networked system, one or more computer systems can store and serve the data to other computer systems. The one or more computer systems that store and serve the data can be referred to as servers or the cloud in a cloud computing scenario. The one or more computer systems can include one or more web servers, for example. The other computer systems that send and receive data to and from the servers or the cloud can be referred to as client or cloud devices, for example. Various operations of the central controller 110, the edge controller 120 and the DERs 130 illustrated above may be supported by operation of the distributed computing systems.

The computing device 200 may be operative to control operation of the components of the system illustrated above through a communication device such as, e.g., a communication device 220, and to handle data provided from data sources. In some examples, analysis results are provided by the computing device 200 in response to the at least one processing element 204 executing instructions contained in memory 206 or 208 and performing operations on the received data items. Execution of instructions contained in memory 206 and/or 208 by the at least one processing element 204 configure the central controller 110, the edge controller 120, and/or the DERs 130 to perform various operations and methods described herein.

The term "computer-readable medium" as used herein refers to any media that participates in providing instructions to the processing element 204 for execution. Such a medium may take many forms, including but not limited to, non-volatile media, volatile media, and transmission media. Non-volatile media includes, for example, optical or magnetic disks, such as disk storage 210. Volatile media includes dynamic memory, such as memory 206. Transmission media includes coaxial cables, copper wire, and fiber optics, including the wires that include bus 202.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to the processing element 204 for execution. For example, the instructions may initially be carried on the magnetic disk of a remote computer. The remote computer can load the instructions into its dynamic memory and send the instructions over a telephone line using a modem. A modem local to computing device 200 can receive the data on the telephone line and use an infra-red transmitter to convert the data to an infra-red signal. An infra-red detector coupled to bus 202 can receive the data carried in the infra-red signal and place the data on bus 202. Bus 202 carries the data to memory 206, from which the processing element 204 retrieves and executes the instructions. The instructions received by memory 206 and/or memory 208 may optionally be stored on storage device 210 either before or after execution by the processing element 204.

In accordance with various embodiments, instructions operative to be executed by a processing element to perform a method are stored on a computer-readable medium. The computer readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

Figure 3:
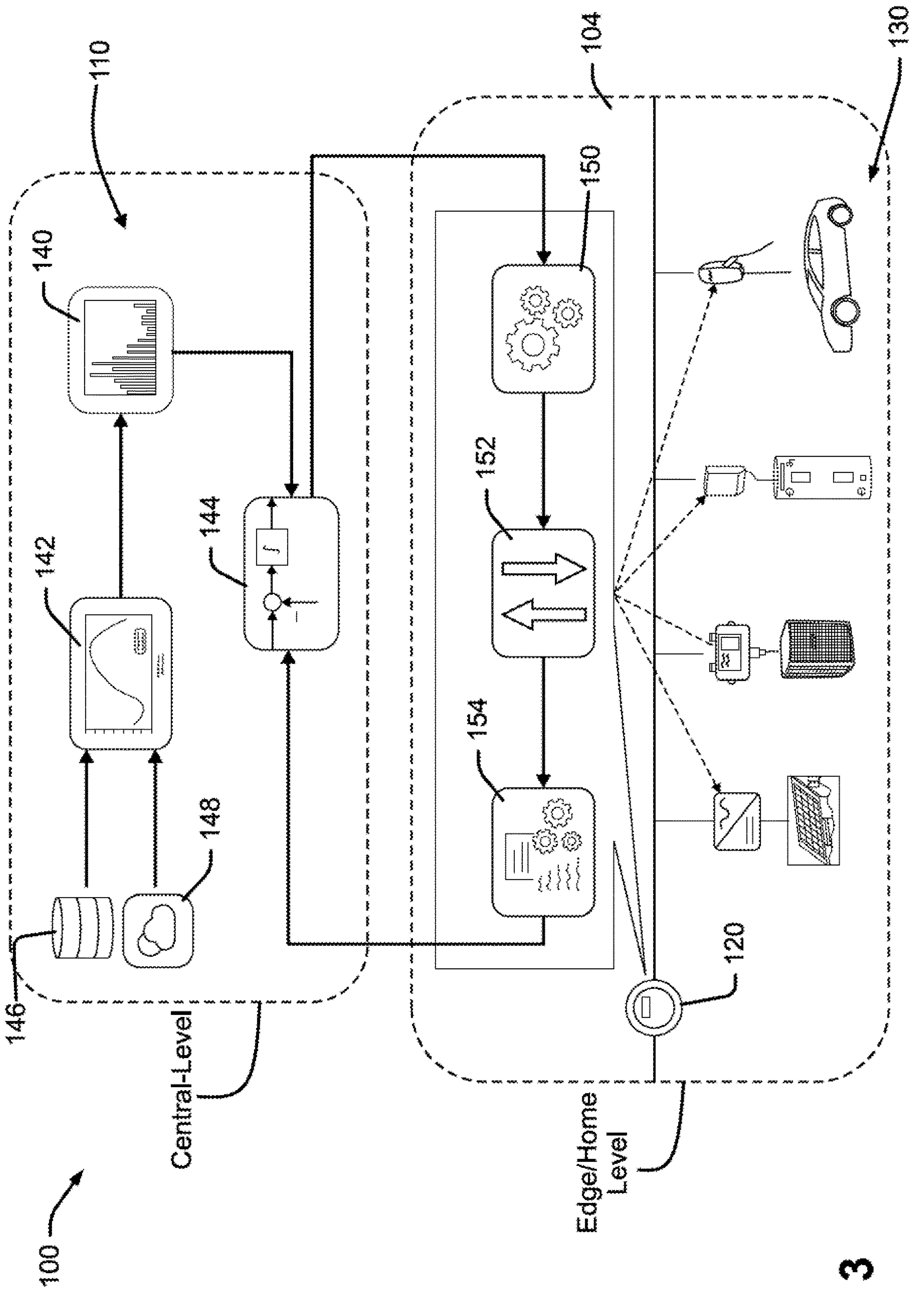
FIG. 3 is a block diagram illustrating further aspects of an embodiment the power grid management system illustrated in FIG. 1.

FIG. 3 illustrates further aspects of examples of the central controller 110 and the edge controller 120. During a grid service or DR event, a desired grid load is determined at the central level to meet specific grid objectives. This desired grid power is fulfilled by homes 104 connected to the grid node, with the edge controller 120 controlling the various associated DERs 130 to achieve the desired grid power. In accordance with disclosed embodiments, two-way communication is employed to achieve this control.

Referring to FIG. 3, the central controller 110 may include various function blocks implemented via software and/or hardware or combinations thereof. Such function blocks may include a forecasting block 142 that forecasts required loads for predetermined time periods, such as for the following day. The forecasting block 142 receives various inputs, such as historical data from a database 146 and weather data from various weather services 148. The load forecast is output from the forecasting block 142 to a reserve estimation block 140, which determines a risk-based reference that may be used for the grid service control. The reference signal output by the reserve estimation block 140 is received by a control block 144, which compares data received from the edge controller(s) 120 to the reference signal.

The edge controller 120 includes a coordination control block 150 that receives the reference signal from the control block 144. Based on the reference signal, the coordination control block 150 sends control signals to a communications interface 152, which outputs control signals to the various DERs 130 to control energy consumption or generation of the DERs 130. For example, based on the control systems determined by the coordination control block 150, one or more of the DERs 130 may be cycled on and off to achieve a desired power usage. The communications interface 152 further receives feedback from the DERs 130 regarding power usage, and this information is output to a data processing and storage block 154. The information regarding power usage information is sent from the data processing and storage block 154 to the control block 144 of the central controller 110. As noted above, this information is compared to the reference signal and further adjustments are made if necessary.

Thus, two-way communication between the central controller 110 and the edge controller 120 is established where reference signal(s) are provided from the central controller 110 to the edge controller 120 to communicate and embed desired grid load information. Further, feedback signal(s) are provided from the edge controller 120 to the central controller 110 as a correction mechanism.

Some disclosed embodiments provide communications processes between central controller 110 and the edge controller 120 in a hierarchical distributed grid control, and further facilitate communication by simplified signals and messages that address different communication requirements.

More particularly, communication and signals exchange between the edge controller 120 and the central controller 110 during a DR or grid service event are provided by uniformly broadcasted messages. In other words, all of the homes 104 receive the same message from the central controller 110 during the service event. Accordingly, the central controller 110 does not necessarily send individualized messages to the individual homes 104. However, based on this uniform broadcasted message from the central controller 110, the edge controllers 120 of the individual homes 104 respond independently based on their individual DER controls. Thus, even though the same message is broadcast from the central controller 110 to each of the homes 104, the edge controllers 120 for each of the homes 104 may provide a unique response, since there is likely to be different load utilizations among the homes 104. In this manner, communication bandwidth may be reduced and users' privacy may be protected using simple, low throughput data, since individualized messages are not sent from the central controller 110 to the various edge controllers 120. Moreover, in some examples the feedback signal sent from the edge controller 120 to the central controller 110 is "generic" in that only adjusted power usage information is sent from the data processing and storage block 154 of the edge controllers 130, rather than specific information related to the usage of the various DERs 130. This avoids exposing appliance level utilizations in the homes 104.

Figure 4:
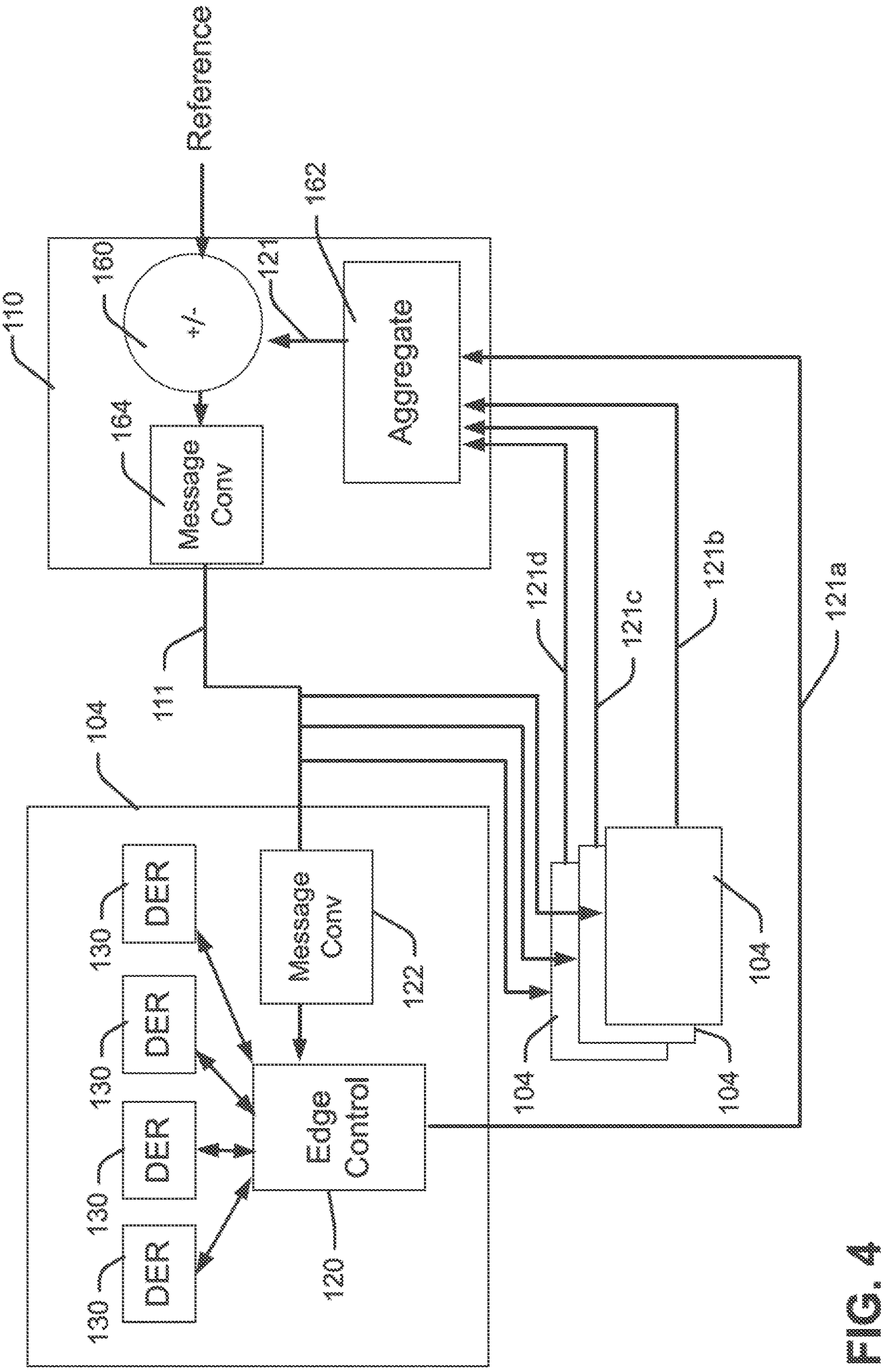
FIG. 4 is a block diagram illustrating still further aspects of an embodiment the power grid management system illustrated in FIG. 1.

FIG. 4 is a block diagram illustrating further aspects of the grid control system 100. As noted previously, the edge level controller 120 is configured to send a uniform (i.e. same) message to each of the edge controllers 120 for adjusting power usage such as during a grid service event. In response to this uniform message, each of the edge controllers 120 controls its associated DERs 130 to adjust power usage of the home 104 accordingly. Each of the edge controllers 120 sends respective feedback data to the central controller 110 based on the modified energy usage of the associated DERs.

Thus, a power reference is determined and input to the central controller 110, which functions as a setpoint. In some grid service events, such as a DR, the power reference may be a maximum power threshold, though other power reference types may be employed, such as frequency regulation, demand management, voltage regulation, etc. The reference information is received by a summation block 160 of the central controller 110, which outputs an error signal that is converted to a uniform adjustment message 111 by a message conversion block 164. The uniform adjustment message 111 is sent to each of the edge controllers 120 associated with each of the homes 104. In other words, the edge controllers 120 of each of the homes 104 receives the same adjustment message 111 from the central controller 110. The uniform adjustment message 111 is converted to a grid service parameter by a message conversion block 122 at each home 104. For simplicity, details for only one of the homes 104 is shown in FIG. 4. Further, as noted above, the "homes" 104 are not limited to homes or houses per se, but could include any dwelling or structure that includes DERs and receives power from a utility.

Based on the received adjustment message 111, each of the edge controllers 120 controls its associated DERs 130 to modify energy usage of the associated DERs 130. In some grid service events, such as a DR, the edge controllers 120 are configured to control maximum power thresholds, though other grid service controls may be employed, such as frequency regulation, demand management, voltage regulation, etc. Each of the edge controllers 120 then sends respective feedback data 121*a*, 121*b*, 121*c*, 121*d* back to the central controller 110 based on the modified energy usage of the associated DERs 130. In certain examples disclosed herein, the feedback data 121*a-d* sent by the respective edge controllers 120 to the central controller 110 only includes revised energy usage information, rather than data relating to the individual DERs 130. This simplifies feedback message, in turn reducing required communications bandwidth while limiting the amount of private information that may be sent to the central controller 110.

The feedback data 121*a-d* from each of the respective edge controllers 120 is received by an aggregator block 162, which is configured to aggregate the feedback data 121*a-d* provided by the individual edge controllers 120, and output an aggregated energy usage signal 121 to the summation block 160. The aggregated feedback data 121 is compared to the reference signal at the summation block 160 to determine an error, and the adjustment message is modified accordingly. The modified adjustment message 111 is then output by the message conversion block 164 to each of the edge controllers 120.

Figure 5:
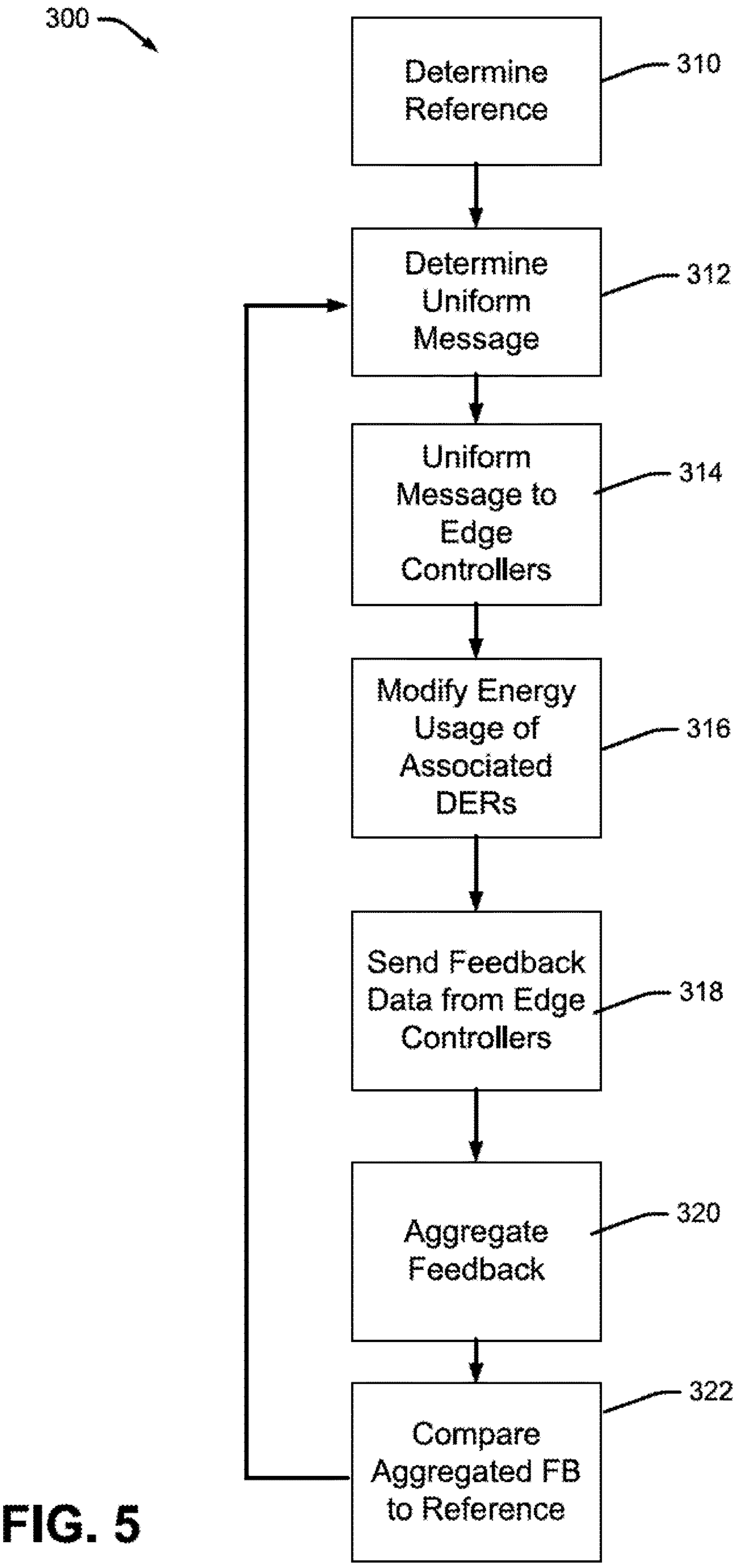
FIG. 5 is a flow diagram illustrating a grid management method that may be implemented by the disclosed power grid management system.

FIG. 5 is a flow diagram further illustrating the grid control method implemented by the system 100 shown in FIG. 4. The method 300 includes determining a reference signal at operation 310. In some implementations, the reference signal is a maximum power threshold, though other grid service controls may use other reference signals, such as frequency threshold, voltage threshold, demand threshold, etc. This reference signal is input to the summation block 160 of the central controller 110, which outputs an error signal. At operation 312, a uniform adjustment message is determined based on the error signal and at operation 314, the uniform adjustment message is sent from the central controller 110 to each of the edge controllers 120. Based on the uniform adjustment message, each of the edge controllers 120 control their associated DERs 130 to modify energy usage of the DERs 130 as shown in operation 316.

Each of the edge controllers 120 then sends feedback to the central controller 110 based on the modified energy usage of the associated DERs 130 in operation 318. As noted above, rather than send information relating to the individual DERs 130, each edge controller 120 sends feedback regarding the modified energy usage of the dwelling 104. At operation 320, the feedback data sent by the individual edge controllers 120 is aggregated by the central controller 110. The aggregated feedback is then compared to the reference signal at operation 322 to determine a new error. Based on the comparison a new uniform adjustment message is determined and sent to the edge controllers 120 to further modify energy usage of the associated DERs 130 (if necessary).

Figure 6:
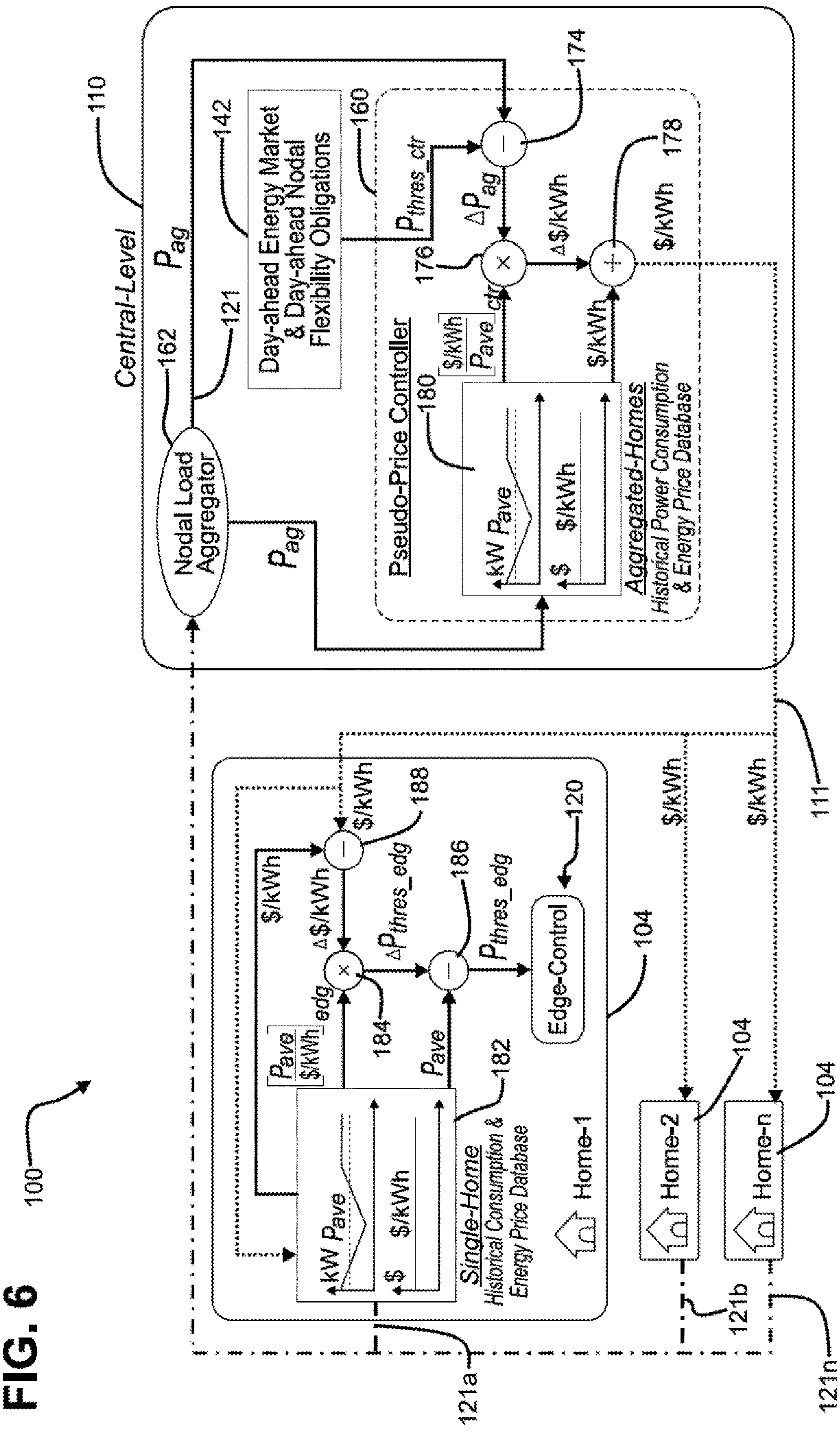
FIG. 6 is a block diagram illustrating example aspects of an embodiment the power grid management system illustrated in FIG. 1.

FIG. 6 illustrates further aspects of an example implementation of the grid control system 100. As noted above, the adjustment message sent from the central controller 110 to the edge controllers 120 is defined to be uniform across the different homes 104 to operate within a low communication bandwidth and also to avoid exposing signals that may be individualized to any specific home 104. The example of FIG. 6 controls energy consumption based on an energy price model. Thus, in the example shown in FIG. 6, a uniform "pseudo price signal" 111 reflecting dollars per kilowatt-hour hour power ($/kWh) is broadcast to the edge controllers 120 of each of the homes 104. For simplicity, FIG. 6 illustrates details for only one of the homes 104.

Further, while each of the edge controllers 120 for the respective homes 104 sends a unique feedback signal (i.e.

signal 121*a* from "Home-1," 121*b* from "Home-2," and so on through signal 121*n* from "Home-n") to the central controller 110, the feedback signals 121*a-n* from the edge controllers 120 are "generic" enough to avoid exposing DER level (i.e. individual appliance level) utilizations in the homes 104. Hence, only power consumption information for the respective homes 104 is provided, and the aggregated power consumption 121 from individual homes as output by the aggregator 162 is used as feedback to the central controller 110.

At the central controller 110, the home feedback signals 121*a-n* are aggregated at the nodal level by the aggregator 162, where the nodal level represents a particular reference point or location on the electrical distribution network common to the associated edge controller homes. In some examples, the aggregator 162 is configured to add the received individual feedback signals 121*a-n*. The example of FIG. 6 controls energy consumption based on an energy price model. Thus, the summation block 160 shown in FIG. 4 is implemented as a pseudo-price controller in the example of FIG. 6. The aggregated feedback signals 121 in FIG. 6 are aggregated power feedback signals (P_ag), which are input to the pseudo-price controller 160 of the central controller 110. More specifically, the aggregated power feedback signal P_ag 121 is input to a subtraction block 174, along with the reference signal. In the example of FIG. 6, the reference signal is a power threshold signal $P_{thres\_ctr}$ for the controlled homes 104, which is determined by the forecasting block 142, for example, based on day-ahead energy market and nodal flexibility obligations. The subtraction block 174 is configured to determine the difference between the power threshold $P_{thres\_ctr}$ and the aggregated power feedback signal P_ag. The subtraction block 174 provides an adjusted power feedback signal $\Delta P_{ag}$, which is determined according to $$\Delta P_{ag} = P_{ag} - P_{thres\_ctr}.$$

Thus, the adjusted power feedback signal $\Delta P_{ag}$ is an error signal based on the difference between the reference power threshold $P_{thres\_ctr}$ and the aggregated power feedback signal P_ag.

The aggregated power feedback values P_ag 121 are stored in a historical power consumption and energy price database 180 of the central controller 110. The database 180 provides data to calculate the central load-to-price behavior of the aggregated controlled homes 104, as represented by a $$\left[\frac{\$/\text{kWh}}{P_{ave}}\right]_{ctr}$$

correlation shown in FIG. 6. In other implementations, the nodal level correlation factor can be determined by machine-learning processes, regression analysis, or other correlation processes.

The central load-to-price correlation $$\left[\frac{\$/\text{kWh}}{P_{ave}}\right]_{ctr}$$

is provided to a multiply block 176, which applies the central load-to-price correlation $$\left[\frac{\$/\text{kWh}}{P_{ave}}\right]_{ctr}$$

factor to me adjusted power feedback signal $\Delta P_{ag}$. The multiply block 176 outputs a pseudo-price adjustment Δ$/kWh for the current control cycle according to $$\Delta\$/\text{kWh} = \left[\frac{\$/\text{kWh}}{P_{ave}}\right]_{ctr} \times \Delta P_{ag}.$$

The control cycle adjustment Δ$/kWh is input to a summing block 178 along with a historical aggregated energy price $/kWh figure. The summing block 178 then outputs an updated pseudo price signal $/kWh 111 according to $$\$/\text{kWh}=\$/\text{kWh}+\Delta\$/\text{kWh}$$

where $/kWh is the previous-cycle price signal. In other words, the pseudo price signal correction term Δ$/kWh is added to the previous time-step pseudo price signal to calculate the corrected pseudo-signal $/kWh 111, which is sent to each of the homes 104 (i.e. edge controllers 120).

The edge controllers 120 are configured to implement a similar process. The edge-level correlation factors $$\left[\frac{P_{ave}}{\$/\text{kWh}}\right]_{edg}$$

for the respective homes 104 are calculated using locally stored data, for example. More specifically, historical average home load $P_{ave}$ and uncorrected pseudo-price information $/kWh is stored in a single home historical power consumption and energy price database 182. This database may be stored locally in memory of the edge controller 120, or the database may be stored in memory remote from the edge controller 120, in which case the edge controller 120 accesses the historical data from the remote database. The historical average home load $P_{ave}$ and the uncorrected pseudo price $/kWh are used to calculate the edge level correlation $$\left[\frac{P_{ave}}{\$/\text{kWh}}\right]_{edg}$$

tor me respective edge controller 120 (i.e. home 104). Thus, in the illustrated example, the edge level correlation factor is determined based on a simple ratio between the historical average home load P_ave and the price signal $/kWh. In other examples, the home level correlation may be determined using machine learning processes, regression analysis, or other data correlation techniques.

Note that this correlation is specific to each individual home 104, depending on the local load behavior. The change in power threshold requested by the central controller 110 is broadcast to all of the homes 104 during a grid service event.

If a pseudo price adjustment message 111 is received with a change in the pseudo price value Δ$/kWh, the edge controller 120 is configured to adjust the change in power-threshold. As shown in FIG. 6, the pseudo price adjust \$/kWh (i.e. uniform adjustment message 111) is input to a subtraction block 188 along with the historical price signal \$/kWh from the edge level database 182. The subtraction block 188 is configured to determine whether the uniform adjustment message pseudo price value \$/kWh changed. In other words, the subtraction block 188 determines the difference between the pseudo price \$/kWh and the current price \$/kWh.

The subtraction block 188 of the edge controller 120 outputs the change in the pseudo price Δ\$/kWh to a multiply block 184, which determines the adjusted power threshold for the particular edge controller 120 (i.e. home 104) $\Delta P_{thres\_edg}$ according to $$\Delta P_{thres\_edg} = \left[\frac{P_{ave}}{\$/\text{kWh}}\right]_{edg} \times \Delta\$/\text{kWh}.$$

The adjusted power threshold $\Delta P_{thres\_edg}$ and the historical average home load $P_{ave}$ are provided to a subtraction block 186, which outputs a new edge level (i.e. home level) power threshold $P_{thres\_edg}$ according to $$P_{thres\_edg} = P_{ave} - \Delta P_{thres_{edg}}.$$

The edge controller 120 then controls operation of the associated DERs 130 based on this edge level power threshold $P_{thres\_edg}$.

Thus, as discussed herein, the central controller sends a uniform pseudo signal (i.e. adjustment message) to all of the homes 104, but load consumption for each individual home 104 is controlled by the corresponding edge controller 120 based on its individual load behaviors. This is accomplished by decentralizing the adjust message 111 (price pseudo signal), using aggregated power threshold correlation learnings at each individual home 104 and at the central level, while utilizing a common signal as a correction term. Among other things, this facilitates low communication bandwidth and addresses user privacy concerns.

++++++++++++++++++++

Examples of the disclosure may be described according to the following aspects.

Aspect 1. A method, comprising determining a power reference; sending a first message from a first controller to each of a plurality of second controllers based on the power reference, each of the plurality of second controllers configured to control a plurality of associated distributed energy resources (DERs); modifying energy usage of the associated DERs by each of the plurality of second controllers based on the first message; sending feedback data to the first controller message based on the modified energy usage of the associated DERs by each of the plurality of second controllers; aggregating the feedback data by the first controller; comparing the aggregated feedback data to the power reference; and sending a second message from the first controller to each of the plurality of second controllers based on the comparison of the aggregated feedback data to the power reference.

Aspect 2. The method of aspect 1, further comprising further modifying energy usage of the associated DERs by each of the plurality of second controllers based on the second message.

Aspect 3. The method of aspect 1 or 2, wherein the first message is based on an energy price.

Aspect 4. The method of any one of aspects 1-3, wherein the feedback data does not include individual DER feedback data.

Aspect 5. The method of any one of aspects 1-4, wherein the feedback data includes net energy consumption data for the associated DERs.

Aspect 6. The method of aspect 5, wherein aggregating the feedback data includes adding the energy consumption data sent from each of the second controllers.

Aspect 7. The method of aspect 6, wherein the power reference is a power threshold signal $P_{thres\_ctr}$, the aggregated feedback data is an aggregated power feedback signal P_ag, and wherein the method further comprises determining an error signal $\Delta P_{ag}$ based on the difference between the power threshold signal $P_{thres\_ctr}$ and the aggregated power feedback signal P_ag.

Aspect 8. The method of aspect 7, further comprising determining a central load-to-price correlation factor $$\left[\frac{\$/\text{kWh}}{P_{ave}}\right]_{ctr}$$

based on aggregated historical power consumption data $P_{ave}$ and historical energy price data \$/kWh; applying the central load-to-price correlation factor $$\left[\frac{\$/\text{kWh}}{P_{ave}}\right]_{ctr}$$

to the error signal $\Delta P_{ag}$ to calculate a control cycle adjustment Δ\$/kWh; and wherein the first message includes a pseudo price signal \$/kWh determined according to $$\$/\text{kWh} = \$/\text{kWh} + \Delta\$/\text{kWh}.$$

Aspect 9. The method of aspect 8, further comprising determining an edge level price-to-load correlation factor $$\left[\frac{P_{ave}}{\$/\text{kWh}}\right]_{edg}$$

for each of the second controllers based on edge level historical power consumption data $P_{ave}$ and energy price data \$/kWh; determining an adjusted pseudo price signal Δ\$/kWh by comparing the first message pseudo price signal \$/kWh to the edge level energy price data \$/kWh; applying the edge level price-to-load correlation factor $$\left[\frac{P_{ave}}{\$/\text{kWh}}\right]_{edg}$$

to the adjusted pseudo price signal Δ\$/kWh to determine an edge level adjusted power threshold $\Delta P_{thres\_edg}$; comparing the edge level adjusted power threshold $\Delta P_{thres\_edg}$ to the edge level historical power consumption data $P_{ave}$ to determine an edge level power threshold $P_{thres\_edg}$; and wherein the energy usage of the associated DERs is modified based on the edge level power threshold $P_{thres\_edg}$.

Aspect 10. A system, comprising a first controller configured to determine a power reference; send a first message to each of a plurality of second controllers based on the power reference, each of the plurality of second controllers configured to control a plurality of associated distributed energy resources (DERs); receive feedback data from each of the plurality of second controllers based on modified energy usage of the associated DERs based on the first message; aggregate the received feedback data; compare the aggregated feedback data to the power reference; and send a second message to each of the plurality of second controllers based on the comparison of the aggregated feedback data to the power reference.

Aspect 11. The system of aspect 10, wherein each of the second controllers is associated with a respective dwelling.

Aspect 12. The system of aspect 10 or 11, wherein the DERs include at least one of an air conditioner, a heat pump, an electric vehicle charger, a solar energy panel, an energy storage device, and electric water heater.

Aspect 13. The system of any one of aspects 10-12, wherein the first controller is configured to determine the first message based on energy price.

Aspect 14. The system of any one of aspects 10-13, further comprising a database accessible by the first controller, the database storing historical power consumption data related to the DERs and energy price data, wherein the first controller is configured to determine a load-to-price correlation factor based on the stored historical power consumption data and the energy price data.

Aspect 15. The system of any one of aspects 10-14, further comprising a database accessible by the second controller, the database storing historical power consumption data related to the DERs associated with the second controller, wherein the second controller is configured to determine a price-to-load correlation factor based on the stored historical power consumption data and the energy price data.

Aspect 16. A system, comprising a plurality of edge controllers, each of the plurality of edge controllers associated with a respective dwelling receiving power from a utility; each of the plurality of edge controllers configured to receive a uniform power adjustment message from a central controller; each of the plurality of edge controllers configured to modify energy usage of a plurality of associated distributed energy resources (DERs) based on the uniform power adjustment message; and each of the plurality of edge controllers configured to send feedback data to the central controller based on the modified energy usage of the plurality of DERs.

Aspect 17. The system of aspect 16, wherein the uniform power adjustment message is based on historical edge level power consumption and energy price data.

Aspect 18. The system of aspect 16 or 17, wherein the uniform power adjustment message is based on a central power reference received by the central controller, and wherein each of the edge controllers is configured to determine a respective edge level power threshold based on the central power reference and the historical edge level power consumption and the energy price data.

Aspect 19. The system of any one of aspects 16-18, wherein the central controller is configured to aggregate the feedback data from each of the plurality of edge controllers.

Aspect 20. The system of any one of aspects 16-19, wherein the central controller is configured to modify the uniform power adjustment message based on the aggregated feedback data from each of the plurality of edge controllers, and wherein each of the plurality of edge controllers is configured to receive the modified uniform price message from the central controller.

The foregoing outlines features of example embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:

determining a power reference;

sending a uniform first message from a first controller to each of a plurality of second controllers based on the power reference, each of the plurality of second controllers configured to control a plurality of associated distributed energy resources (DERs), wherein each of the plurality of second controllers receives the same first uniform message from the first controller;

modifying energy usage of the associated DERs by each of the plurality of second controllers based on the uniform first message;

sending feedback data to the first controller based on the modified energy usage of the associated DERs by each of the plurality of second controllers;

aggregating the feedback data by the first controller;

comparing the aggregated feedback data to the power reference; and sending a uniform second message from the first controller to each of the plurality of second controllers based on the comparison of the aggregated feedback data to the power reference.

2. The method of claim 1, further comprising:

further modifying energy usage of the associated DERs by each of the plurality of second controllers based on the uniform second message.

3. The method of claim 1, wherein the uniform first message is based on an energy price.

4. The method of claim 1, wherein the feedback data does not include individual DER feedback data.

5. The method of claim 1, wherein the feedback data includes net energy consumption data for the associated DERs.

6. The method of claim 5, wherein aggregating the feedback data includes adding the energy consumption data sent from each of the second controllers.

7. The method of claim 6, wherein the power reference is a power threshold signal $P_{thres\_ctr}$, the aggregated feedback data is an aggregated power feedback signal P_ag, and wherein the method further comprises:

determining an error signal $\Delta P_{ag}$ based on the difference between the power threshold signal $P_{thres\_ctr}$ and the aggregated power feedback signal P_ag.

8. The method of claim 7, further comprising:

determining a central load-to-price correlation factor $$\left[\frac{\$/\text{kWh}}{P_{ave}}\right]_{ctr}$$

based on aggregated historical power consumption data $P_{ave}$ and historical energy price data $\$/\text{kWh}$;

applying the central load-to-price correlation factor $$\left[\frac{\$/\text{kWh}}{P_{ave}}\right]_{ctr}$$

to the error signal $\Delta P_{ag}$ to calculate a control cycle adjustment $\Delta\$/\text{kWh}$; and wherein the uniform first message includes a pseudo price signal $\$/\text{kWh}$ determined according to $$\$/\text{kWh}=\$/\text{kWh}+\Delta\$/\text{kWh}.$$

9. The method of claim 8, further comprising:

determining an edge level price-to-load correlation factor $$\left[\frac{P_{ave}}{\$/\text{kWh}}\right]_{edg}$$

for each of the second controllers based on edge level historical power consumption data $P_{ave}$ and energy price data $\$/\text{kWh}$;

determining an adjusted pseudo price signal $\Delta\$/\text{kWh}$ by comparing the uniform first message pseudo price signal $\$/\text{kWh}$ to the edge level energy price data $\$/\text{kWh}$;

applying the edge level price-to-load correlation factor $$\left[\frac{P_{ave}}{\$/\text{kWh}}\right]_{edg}$$

to the adjusted pseudo price signal $\Delta\$/\text{kWh}$ to determine an edge level adjusted power threshold $\Delta P_{thres\_edg}$;

comparing the edge level adjusted power threshold $\Delta P_{thres\_edg}$ to the edge level historical power consumption data $P_{ave}$ to determine an edge level power threshold $P_{thres\_edg}$; and wherein the energy usage of the associated DERs is modified based on the edge level power threshold $P_{thres\_edg}$.

10. A system, comprising:

a first controller configured to:

determine a power reference;

send a uniform first message to each of a plurality of second controllers based on the power reference, each of the plurality of second controllers configured to control a plurality of associated distributed energy resources (DERs), wherein each of the plurality of second controllers receives the same first uniform message from the first controller;

receive feedback data from each of the plurality of second controllers based on modified energy usage of the associated DERs based on the uniform first message;

aggregate the received feedback data;

compare the aggregated feedback data to the power reference; and send a uniform second message to each of the plurality of second controllers based on the comparison of the aggregated feedback data to the power reference.

11. The system of claim 10, wherein each of the second controllers is associated with a respective dwelling.

12. The system of claim 10, wherein the DERs include at least one of an air conditioner, a heat pump, an electric vehicle charger, a solar energy panel, an energy storage device, and electric water heater.

13. The system of claim 10, wherein the first controller is configured to determine the uniform first message based on energy price.

14. The system of claim 10, further comprising a database accessible by the first controller, the database storing historical power consumption data related to the DERs and energy price data, wherein the first controller is configured to determine a load-to-price correlation factor based on the stored historical power consumption data and the energy price data.

15. The system of claim 10, further comprising a database accessible by the second controller, the database storing historical power consumption data related to the DERs associated with the second controller, wherein the second controller is configured to determine a price-to-load correlation factor based on the stored historical power consumption data and the energy price data.

16. A system, comprising:

a plurality of edge controllers, each of the plurality of edge controllers associated with a respective dwelling receiving power from a utility;

each of the plurality of edge controllers configured to receive a uniform power adjustment message from a central controller, the central controller configured to determine a power reference and base the uniform power adjustment message on the power reference, wherein each of the plurality of edge controllers receives the same uniform power adjustment message from the central controller;

each of the plurality of edge controllers configured to modify energy usage of a plurality of associated distributed energy resources (DERs) based on the uniform power adjustment message;

each of the plurality of edge controllers configured to send feedback data to the central controller based on the modified energy usage of the plurality of associated DERs; and each of the plurality of edge controllers configured to receive a uniform second power adjustment message from the central controller, the uniform second based on aggregating the received feedback data and comparing the aggregated feedback data to the power reference by the central controller, wherein each of the plurality of edge controllers receives the same uniform second power adjustment message from the central controller.

17. The system of claim 16, wherein the uniform power adjustment message is based on historical edge level power consumption and energy price data.

18. The system of claim 16, wherein the uniform power adjustment message is based on a central power reference received by the central controller, and wherein each of the edge controllers is configured to determine a respective edge level power threshold based on the central power reference and the historical edge level power consumption and energy price data.

* * * * *